(12) United States Patent
Kimura et al.

(10) Patent No.: US 12,149,438 B2
(45) Date of Patent: Nov. 19, 2024

(54) COMMUNICATION APPARATUS, SWITCHING CONTROL METHOD AND PROGRAM

(71) Applicant: Nippon Telegraph and Telephone Corporation, Tokyo (JP)

(72) Inventors: Akihiro Kimura, Musashino (JP); Katsuma Miyamoto, Musashino (JP); Hiroki Kano, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 337 days.

(21) Appl. No.: 17/792,467

(22) PCT Filed: Jan. 27, 2020

(86) PCT No.: PCT/JP2020/002812
§ 371 (c)(1),
(2) Date: Jul. 13, 2022

(87) PCT Pub. No.: WO2021/152670
PCT Pub. Date: Aug. 5, 2021

(65) Prior Publication Data
US 2023/0055402 A1  Feb. 23, 2023

(51) Int. Cl.
*H04L 45/28* (2022.01)
*H04L 41/0663* (2022.01)
*H04L 61/2521* (2022.01)

(52) U.S. Cl.
CPC .......... *H04L 45/28* (2013.01); *H04L 41/0663* (2013.01); *H04L 61/2535* (2013.01)

(58) Field of Classification Search
CPC . H04L 45/28; H04L 41/0663; H04L 61/2535; H04L 61/5007
See application file for complete search history.

(56) References Cited

U.S. PATENT DOCUMENTS

| 10,033,667 B1* | 7/2018 | Ghosh | H04L 49/70 |
| 2004/0010583 A1* | 1/2004 | Yu | H04L 45/00 709/224 |

(Continued)

OTHER PUBLICATIONS

English translation International Search Report (ISR); Apr. 21, 2020 (Year: 2020).*

(Continued)

*Primary Examiner* — Benjamin H Elliott, IV
(74) *Attorney, Agent, or Firm* — Fish & Richardson P.C.

(57) ABSTRACT

A communication device, in which a protocol is workable, the protocol enabling formation of a redundancy configuration including a plurality of communication devices by use of a virtual IP address, includes: a table storage unit configured to store a table in which, for each of a plurality of destination networks connected to the communication device through a path, the virtual IP address and the destination network are associated with each other; and a control unit configured to identify, in response to detection of a failure in the path connected to one of the destination networks, the virtual IP address associated with the destination network by reference to the table and cause the identified virtual IP address to transition to another communication device, the another communication device forming the redundancy configuration with the communication device.

9 Claims, 14 Drawing Sheets

(56) References Cited

U.S. PATENT DOCUMENTS

| | | | | | |
|---|---|---|---|---|---|
| 2004/0078481 | A1* | 4/2004 | Rudd | | H04L 67/101 |
| | | | | | 709/238 |
| 2005/0172161 | A1* | 8/2005 | Cruz | | G06F 11/2025 |
| | | | | | 714/4.11 |
| 2008/0181241 | A1* | 7/2008 | Regan | | H04L 45/02 |
| | | | | | 370/401 |
| 2008/0181243 | A1* | 7/2008 | Vobbilisetty | | H04L 45/20 |
| | | | | | 370/406 |
| 2008/0288656 | A1* | 11/2008 | Forrester | | H04L 63/0218 |
| | | | | | 726/11 |
| 2009/0257440 | A1* | 10/2009 | Yan | | H04L 45/586 |
| | | | | | 370/401 |
| 2009/0287955 | A1* | 11/2009 | Matsumoto | | H04L 12/4633 |
| | | | | | 714/E11.113 |
| 2013/0121137 | A1* | 5/2013 | Feng | | H04L 41/0663 |
| | | | | | 370/254 |
| 2013/0242718 | A1* | 9/2013 | Zhang | | H04L 12/4633 |
| | | | | | 370/216 |
| 2014/0204760 | A1* | 7/2014 | Durrani | | H04L 47/125 |
| | | | | | 370/236 |
| 2014/0347976 | A1* | 11/2014 | Keesara | | H04L 45/586 |
| | | | | | 370/219 |
| 2017/0005915 | A1* | 1/2017 | Mirsky | | H04L 45/28 |
| 2017/0230230 | A1* | 8/2017 | Theogaraj | | H04L 41/0654 |
| 2018/0123868 | A1* | 5/2018 | Theogaraj | | H04L 41/0654 |
| 2018/0337885 | A1* | 11/2018 | Singh | | H04L 41/22 |
| 2019/0238440 | A1* | 8/2019 | Theogaraj | | G06Q 30/0241 |
| 2022/0150303 | A1* | 5/2022 | Quevedo | | H04L 67/1038 |
| 2023/0055402 | A1* | 2/2023 | Kimura | | H04L 61/2535 |

OTHER PUBLICATIONS

RFC 5798, "Virtual Router Redundancy Protocol (VRRP) Version 3 for IPV4 and IPV6";, Nadas; Mar. 2010 (Year: 2010).*

[No Author Listed] [online], "FutureNet NXR, WXR series," Century Systems, Co. Ltd., retrieved on Dec. 5, 2019, retrieved from URL <https://www.centurysys.co.jp/futurenet-tech-wiki/setting/setting-5591/>, 15 pages (with English Translation).

* cited by examiner

COMMUNICATION APPARATUS, SWITCHING CONTROL METHOD AND PROGRAM

CROSS-REFERENCE TO RELATED APPLICATIONS

This application is a National Stage application under 35 U.S.C. § 371 of International Application No. PCT/JP 2020/002812, having an International Filing Date of Jan. 27, 2020. The disclosure of the prior application is considered part of the disclosure of this application, and is incorporated in its entirety into this application.

TECHNICAL FIELD

The present invention relates to a technology to cause a plurality of routers of a communication system to work in a redundancy configuration.

BACKGROUND ART

In regard to a communication system that performs IP packet communication, typical redundancy schemes for causing a router to work in a redundancy configuration include a VRRP (Virtual Router Redundancy Protocol) scheme and a multipath scheme.

VRRP is a protocol standardized in RFC 3768. The use of the VRRP scheme makes it possible to achieve a redundancy configuration with a plurality of physical routers (here, by way of example, two routers). VRRP enables the two routers to pretend to be a single virtual router (a single gateway for a host) having a virtual IP address.

One of the two routers that has the higher VRRP priority (referred to as master) becomes active and a virtual IP address is set as an IP address used therefor (as an IP address of a real interface). A packet sent from the host is received by the master router and subjected to a forwarding process by the master router.

The multipath scheme is a scheme that uses a routing protocol such as BGP (Border Gateway Protocol) to provide a multipath (a plurality of routes) for a single destination network.

The combined use of the VRRP scheme and the multipath scheme makes it possible to perform, in response to detection of a failure in one of them, switching to the other as disclosed in, for example, Non-Patent Literature 1.

CITATION LIST

Non-Patent Literature

Non-Patent Literature 1: Century Systems Co., Ltd., FutureNet NXR, WXR series https://www.centurysys.co.jp/futurenet-tech-wiki/setting/setting-5591/

SUMMARY OF THE INVENTION

Technical Problem

In regard to a scheme using the VRRP scheme and the multipath scheme in combination, there is a concern that in a case where two routers (a single virtual router) in which VRRP is workable are connected to a plurality of networks, occurrence of a failure in an active route connected to one of the networks causes communication with another network to be performed by a one-system operation even though no failure occurs in a multipath route connected to the other network, which results in a reduced reliability.

The present invention has been made in view of the above point and an object thereof is to provide a technology for improving reliability of a communication system using a protocol and a multipath, the protocol enabling formation of a redundancy configuration including a plurality of communication devices by use of a virtual IP address.

Means for Solving the Problem

A disclosed technology provides a communication device in which a protocol is workable, the protocol enabling formation of a redundancy configuration including a plurality of communication devices by use of a virtual IP address, the communication device including:

a table storage unit configured to store a table in which, for each of a plurality of destination networks connected to the communication device through a path, the virtual IP address and the destination network are associated with each other; and a control unit configured to identify, in response to detection of a failure in the path connected to one of the destination networks, the virtual IP address associated with the destination network by reference to the table and cause the identified virtual IP address to transition to another communication device, the another communication device forming the redundancy configuration with the communication device.

Effects of the Invention

The disclosed technology makes it possible to improve reliability of a communication system using a protocol and a multipath, the protocol enabling formation of a redundancy configuration including a plurality of communication devices by use of a virtual IP address.

DESCRIPTION OF EMBODIMENTS

Description will be made below on an embodiment of the present invention (the present embodiment) with reference to the drawings. The embodiment described below is merely by way of example and an embodiment to which the present invention is applicable is not limited to the embodiment below.

In the description below, a "router" is used as an example of a communication device; however, a device other than the "router" may be used as the communication device in the present embodiment. For example, a computer, a switch, or the like where VRRP is workable may be used.

Further, in the description below, a protocol referred to as "VRRP" is used; however, a protocol other than the "VRRP" may be used as a protocol enabling formation of a redundancy configuration including a plurality of communication devices by use of a virtual IP address.

To describe a technology according to the present embodiment, a method of performing switching at the time of occurrence of a failure by virtue of a combined use of a VRRP scheme and a multipath scheme will be first described as a related art. In the description below, a master router is referred to as a router (master), whereas a backup router is referred to as a router (backup).

DESCRIPTION OF RELATED ART

Figure 1:
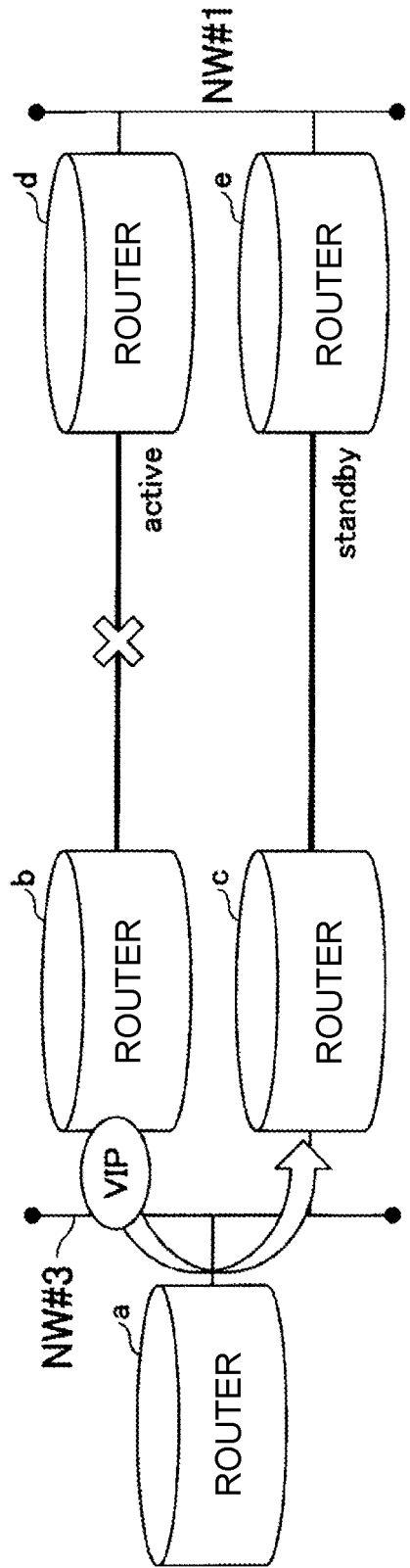
FIG. 1 is a diagram of assistance in explaining a related art.
Figure 2:
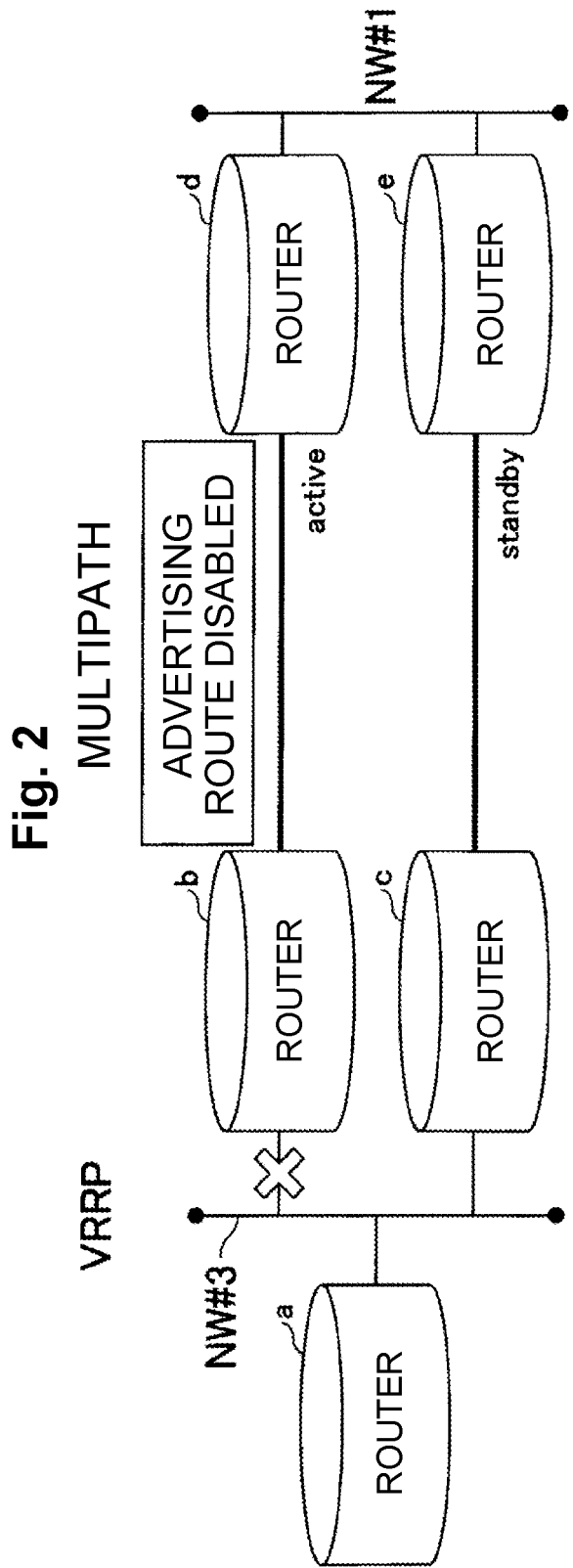
FIG. 2 is a diagram of assistance in explaining a related art.

FIG. 1 is an example of a communication system using the VRRP scheme and the multipath scheme in combination. FIG. 2 shows the same system configuration as FIG. 1. As shown in FIG. 1 and FIG. 2, the communication system includes a router "b" (master) and a router "c" (backup), in which VRRP is workable. In addition, the router "b" and a router "d" are connected by BGP, whereas the router "c" and a router "e" are connected by BGP, thereby providing a multipath.

In a normal state in FIG. 1 (FIG. 2), the router "c" (master) sends an address of NW #3 as route information. At this time, an MED value is, for example, 10. The router "c" (backup) likewise sends route information. An MED value is, for example, 100. Thus, for a communication to a router "a", a route of the router "d" → the router "b" has priority.

In a case where a failure occurs in an active route (a route having the higher priority) in the multipath as shown in FIG. 1, the router "b" (master) lowers a VRRP priority in response to detection of the failure by BGP monitoring. This switches the router "c" (backup) to the master. In the router "c" (master), a virtual IP address is set to an NW #3-side interface, making it possible to perform communication with use of the virtual IP address on an NW #3 side.

FIG. 2 shows a case where a failure occurs in an NW #3-side link of the router "b" (master). In this case, after detecting the failure by link monitoring, the router "b" (master) disables an advertising route to the router "d". In addition, the router "c" becomes unable to receive advertisement from the router "b" and, accordingly, the router "c" is switched to the master.

As described above, by virtue of causing the VRRP scheme and the multipath scheme to work in a mixed manner, transition of the master can be achieved by changing a VRRP-side priority in conjunction with a multipath-side failure. In addition, a multipath-side advertising route can be disabled in conjunction with a VRRP-side failure. The virtual IP address is referred to as "VIP" hereinbelow.

Regarding Problem of Related Art

The above related art is based on the premise that NW #3 is connected to a single network (NW #1). However, a typical network is connected to a plurality of networks in many cases.

Figure 3:
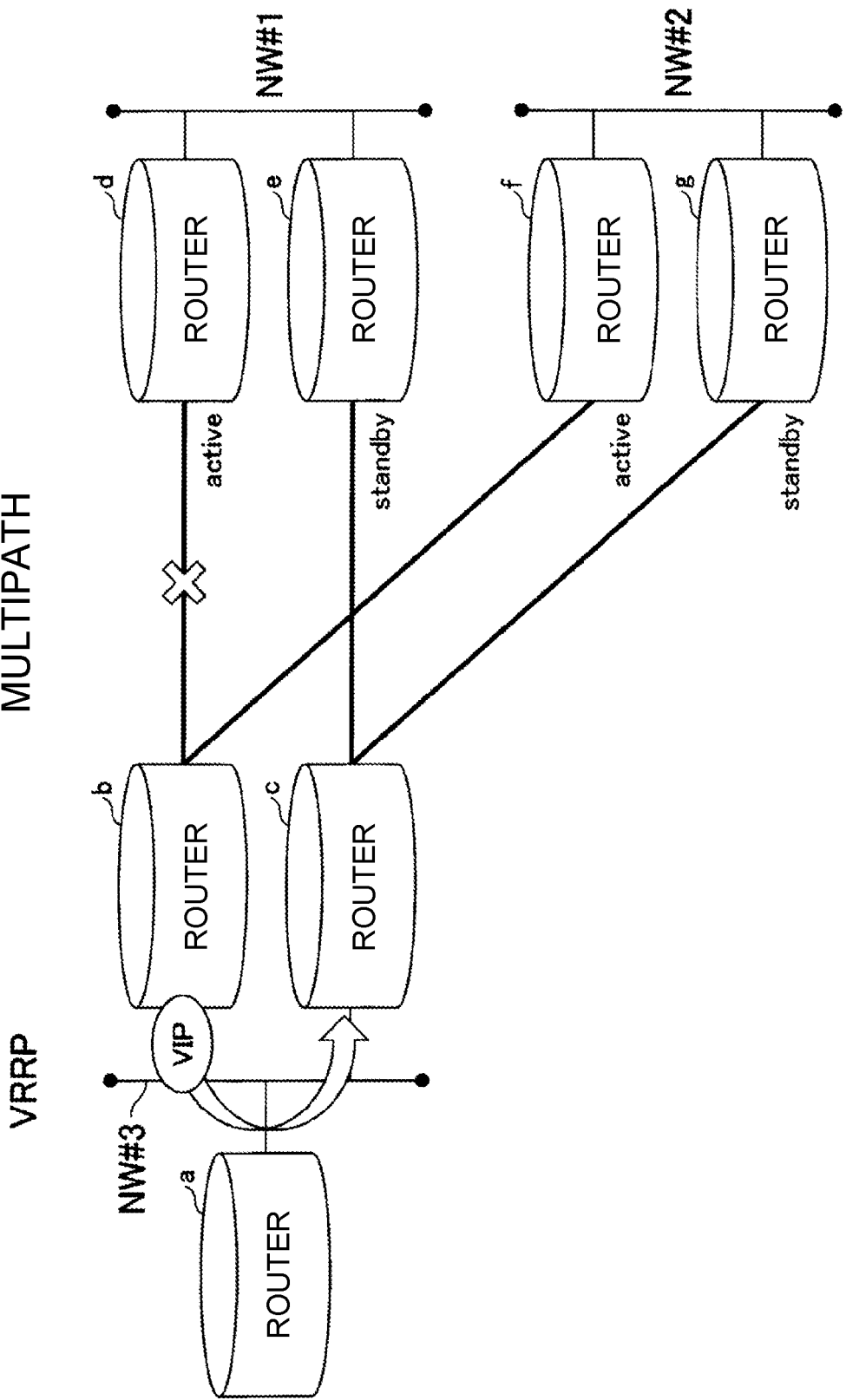
FIG. 3 is a diagram of assistance in explaining a problem.

Accordingly, a case where NW #3 is connected to a plurality of networks (NW #1 and NW #2) as shown in FIG. 3 is considered. As shown in FIG. 3, similarly to NW #1, NW #2 is provided with an active router "f" and a standby router "g" with respective paths provided between the router "f" and the router "b" (master) and between the router "g" and the router "c" (backup).

In this configuration, in response to occurrence of a failure in an active route in a multipath connected to one of the networks (here, NW #1), the router "c" on the NW #3 side is switched to the master as described with reference to FIG. 1, consequently causing transition of a VRRP VIP to the router "c".

At this time, from the point of view of the other network (NW #2), a one-system operation is necessitated in spite of no failure occurring in the active route (the router "b" to the router "f") with reliability reduced.

Configuration and Workings for Solving the Problem

Description will be made below on a configuration and workings for solving the above problem. It should be noted that a redundancy configuration for each VRRP group includes two routers in an example described below but it is by way of example. The redundancy configuration for each VRRP group may include three or more routers.

Figure 4:
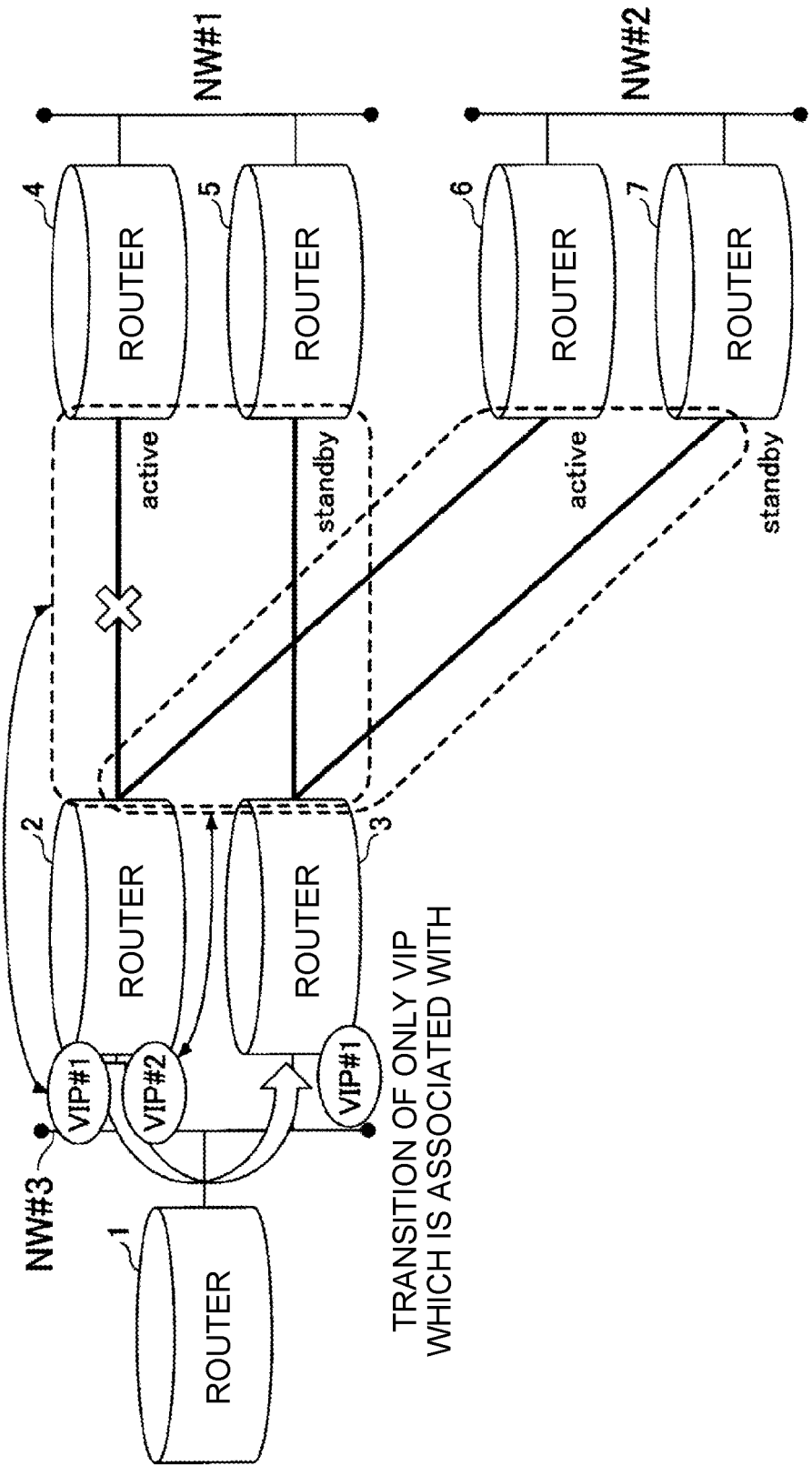
FIG. 4 is a diagram of assistance in explaining a feature 1.

FIG. 4 shows a configuration of a communication system of the present embodiment and the outline of a mechanism for solving the problem.

As shown in FIG. 4, the configuration of the communication system is similar to the configuration shown in FIG. 3, where NW #3 is provided with a router 1 and, further, a router 2 (master) and a router 3 (backup) where VRRP is workable. NW #1 is provided with routers 4 and 5 with a BGP-based multipath provided between the routers 4 and 5 of NW #1 and the router 2 and router 3 of NW #3. In addition, NW #2 is provided with routers 6 and 7 with a BGP-based multipath provided between the routers 6 and 7 of NW #2 and the router 2 and router 3 of NW #3.

In the present embodiment, respective VIPs of destination NWs (in this example, NW #1 and NW #2) are set to the routers where VRRP is workable. The "set" herein means not a VIP being set to a real interface but being set as information. For each VRRP group, in a master router, a VIP is set to a real interface.

In an example in FIG. 4, VIP #1 is associated with NW #1 and VIP #2 is associated with NW #2. It should be noted that setting a plurality of VIPs to a single router is an existing technology in multigroup VRRP per se. In multigroup VRRP, "associated with the same VRID" are referred to as "belonging to a VRRP group.

In the present embodiment, switching between a master and a backup among the routers where VRRP is workable can be independently performed for each destination NW by virtue of different VIPs being associated with the respective destination NWs. Features 1 to 3 will be described below as examples of features related to this mechanism.

(Feature 1)

Here, a VRRP group associated with VIP #1 (VRID=1) is referred to as a VRRP group 1 and a VRRP group associated with VIP #2 (VRID=2) is referred to as a VRRP group 2.

In the system configuration shown in FIG. 4, in a normal state, the router 2 (the master in both the VRRP groups 1 and 2) can use VIP #1 and VIP #2 for communication on the NW #3 side.

For example, it is assumed that the router 1 is set to forward a packet addressed to NW #1 to VIP #1 (in terms of Ethernet frame, to a virtual MAC address corresponding to VIP #1) and forward a packet addressed to NW #2 to VIP #2 (in terms of Ethernet frame, to a virtual MAC address corresponding to VIP #2).

The packet addressed to NW #1 sent from the router 1 is received by the router 2 and forwarded from the router 2 to the router 4. The packet addressed to NW #2 sent from the router 1 is received by the router 2 and forwarded from the router 2 to the router 6.

It is assumed that a failure occurs in an active route between the router 2 and the router 4 as shown in FIG. 4. In this case, a state transition is performed within the VRRP group 1 associated with VIP #1 as described with reference to FIG. 1. Thus, within the VRRP group 1 associated with VIP #1, the router 2 transitions to a standby and the router 3 transitions to a master.

More specifically, in response to detection of the failure in the active route between the router 2 and the router 4 by BGP monitoring, the router 2 lowers a priority within the VRRP group 1 on the basis of association information. This switches the router 3 to a router in the VRRP group 1 and, consequently, VIP #1 transitions to the router 3. Thus, the router 3 is set to be able to use VIP #1 on the NW #3 side. In other words, VIP #1 is set to a NW #3-side interface of the router 3.

After this switching, the packet addressed to NW #1 sent from the router 1 is received by the router 3 with VIP #1 (the master after switching) and forwarded from the router 3 to the router 5 through a standby route.

Meanwhile, a multipath connected to NW #2, which is associated with the VRRP group 2, remains in the normal state, so that the packet addressed to NW #2 sent from the router 1 is received by the router 2 and forwarded from the router 2 to the router 6 through an active route. In the VRRP group 2, the router 3 (backup) is on standby, so that even if a failure occurs in the active route between the router 2 and the router 6, communication can be continued by switching the router 3 to the master.

As described above, by virtue of associating the different VIPs with the respective destination NWs, switching between the master and the backup can be independently performed for each destination NW.

Thus, as described above, in a case where a failure occurs in the active route connected to NW #1, it is possible to make a transition of only VIP #1 associated with NW #1 to the backup router. At this time, VIP #2 associated with NW #2 is still usable by the master router 2, so that the extent of an influence of a reduction in reliability can be limited with the limited situation where there is only one route in a one-system operation state, NW #1.

(Feature 2)

In the present embodiment, the routers where VRRP is workable are each provided with a table for managing a VIP and a destination NW. By virtue of this table, association between the VIP and the destination NW as described in the feature 1 is achieved.

Figure 5:
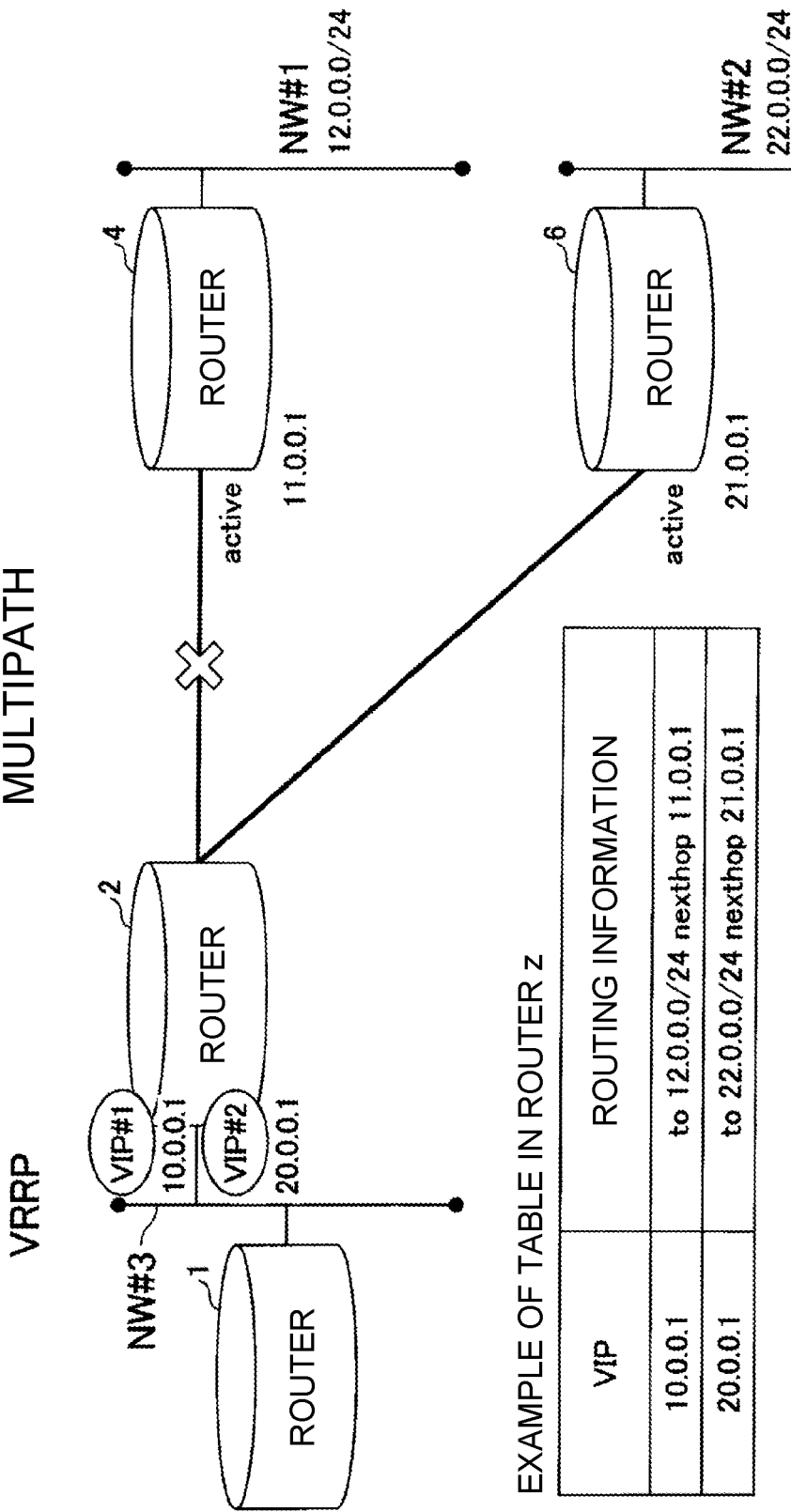
FIG. 5 is a diagram of assistance in explaining a feature 2.

Specifically, as shown in FIG. 5, which shows only a master router as a router where VRRP is workable, the router where VRRP is workable holds the table storing information in which the VIP and routing information to the destination NW are associated with each other. In FIG. 5, for example, VIP #1=10.0.0.1, which is associated with routing information indicating that a packet addressed to an address (12.0.0.0/24) of the destination NW #1 associated with VIP #1 is to be forwarded to 11.0.0.1.

It should be noted that the above table is by way of example and a table in which, for each destination NW, a VIP and an address of the destination NW are associated with each other may be used. In this case, the routing information is held in a separate routing table.

In a case where a route failure occurs in an active route, while deleting the relevant routing information, the router 2 identifies, in response to detection of the route failure in the active route, VIP #1 associated with NW #1 connected to a path where the failure occurs by reference to the table shown in FIG. 5 and causes the VIP #1 to transition to the router 3. Thus, in response to detection of occurrence of a failure in a route between the router 2 and the router 4 (11.0.0.1) connected to NW #1, the router 2 causes the master in the VRRP group 1, which is associated with VIP #1 in the information in the table, to transition from the router 2 to the router 3. Specifically, the priority of the router 2 with respect to the VRRP group 1 is lowered. As a result, as a VIP usable for communication on the NW #3 side, VIP #1 is deleted from the router 2 and set to the router 3.

(Feature 3)

For example, in a case where a failure occurs in an active route as shown in FIG. 1 and then the active route recovers from the failure, failback of the multipath-side route occurs in response to the router restarting route advertisement. This requires re-transition of the VRRP VIP.

Figure 6:
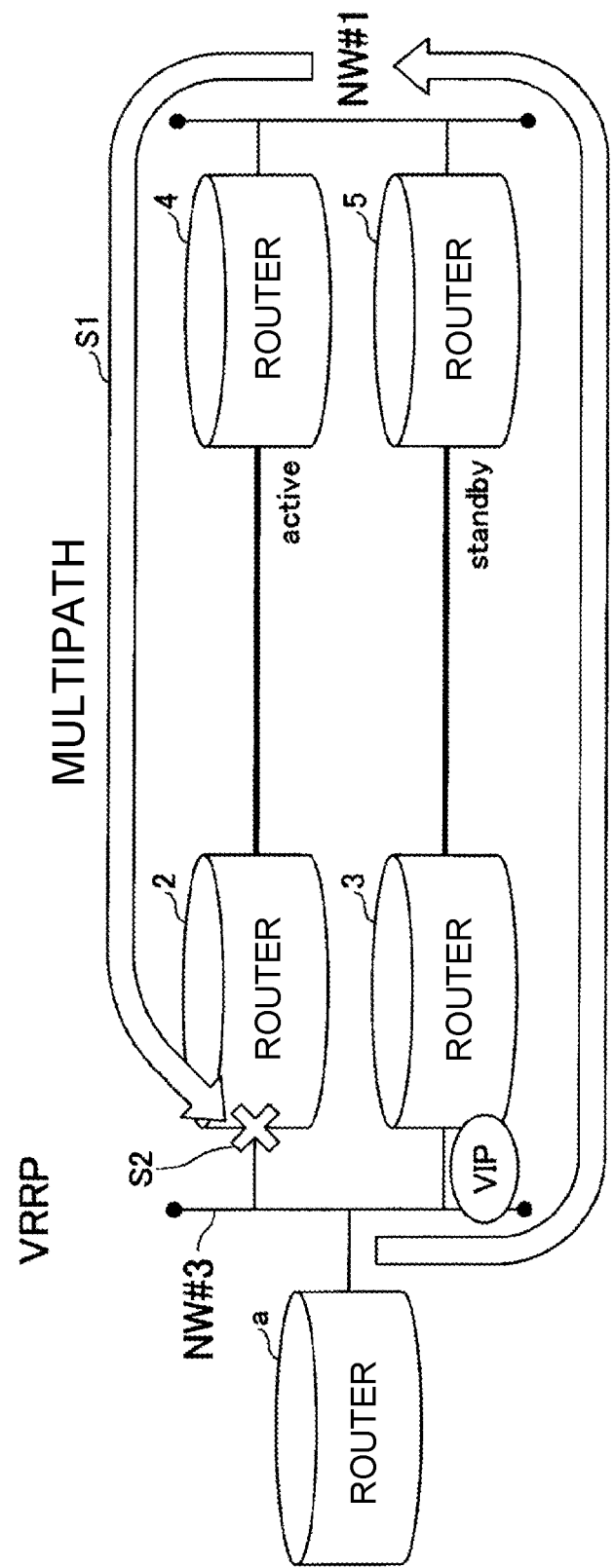
FIG. 6 is a diagram of assistance in explaining a feature 3.

However, in a case where failback of the VIP is not performed (S2) even though S1 (recovery of the active route) is performed as shown in FIG. 6, the router 2 cannot perform communication on the NW #3 side by use of the VIP, which results in occurrence of drop of a packet of communication from NW #1 toward NW #3. Thus, a communication failure temporarily occurs. However, even in this state, communication from NW #3 to NW #1 is successful.

Accordingly, in the present embodiment, when an active route recovers from a failure, a router connected to the active route refrains from route advertisement to an opposite router until failback of a VIP is completed.

Figure 7:
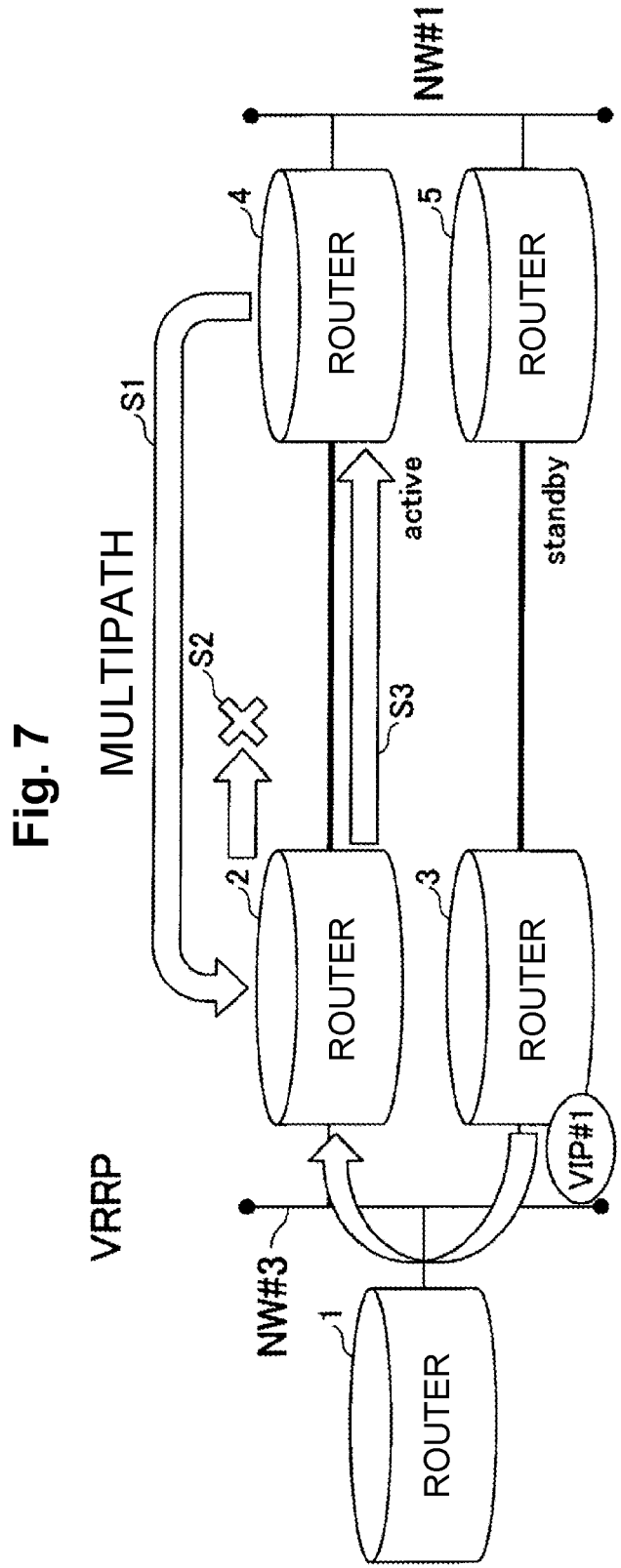
FIG. 7 is a diagram of assistance in explaining the feature 3.

FIG. 7 shows an example of the above workings. FIG. 7 shows a state where after a failure occurs in an active route as shown in FIG. 1, the active route recovers from the failure. At this time, route advertisement is started as shown by S1 and a routing table of the router 2 recovers. However, in S2, the router 2 refrains from route advertisement to the opposite router 4 until the VIP having transitioned to the router 3 returns to the router 2 (i.e., until the router 2 returns to a master state from a backup state and the VIP is set to the NW #3-side interface). In S3, the router 2 performs route advertisement at the same time as return of the VIP to the router 2. This makes it possible to avoid drop of a packet as described with reference to FIG. 6.

(Device Configuration)

Figure 8:
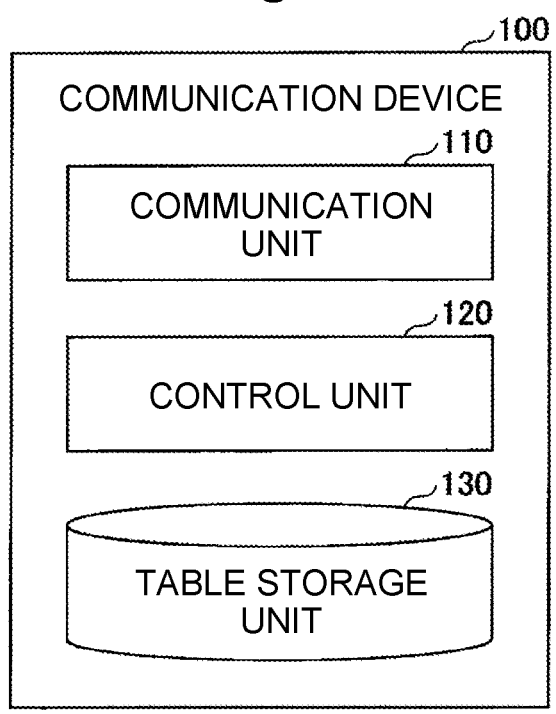
FIG. 8 is a configuration diagram of a communication device 100.

FIG. 8 shows a functional configuration of a communication device 100 according to the present embodiment, where VRRP is workable. The communication device 100 is a communication device suitable as both the router 2 and the router 3 shown in FIG. 4, etc.

As shown in FIG. 8, the communication device 100 includes a communication unit 110, a control unit 120, and a table storage unit 130. The communication unit 110, which includes a communication interface, sends and receives packets. The control unit 120 performs a router control as described in relation to the above feature 1, feature 2, feature 3, etc. The table storage unit 130 stores a table in which, for each of destination NW, a VIP and the destination NW are associated with each other. In response to detection of a failure, the control unit 120 identifies a VIP of a VRRP group that is to transition to another communication device by reference to the table stored in the table storage unit 130 and performs a process for the transition.

The communication device 100 can be implemented by, for example, causing a computer to execute a program. It should be noted that a router and a switch each also include a component corresponding to the "computer."

The communication device 100 can be implemented by executing, with use of hardware resources such as a CPU and a memory provided in the computer, a program corresponding to a process to be performed by the communication device 100. The above program can be recorded in a computer-readable recording medium (a portable memory or the like) and saved or distributed. In addition, the above program can be provided through a network such as the Internet, an e-mail, or the like.

Figure 9:
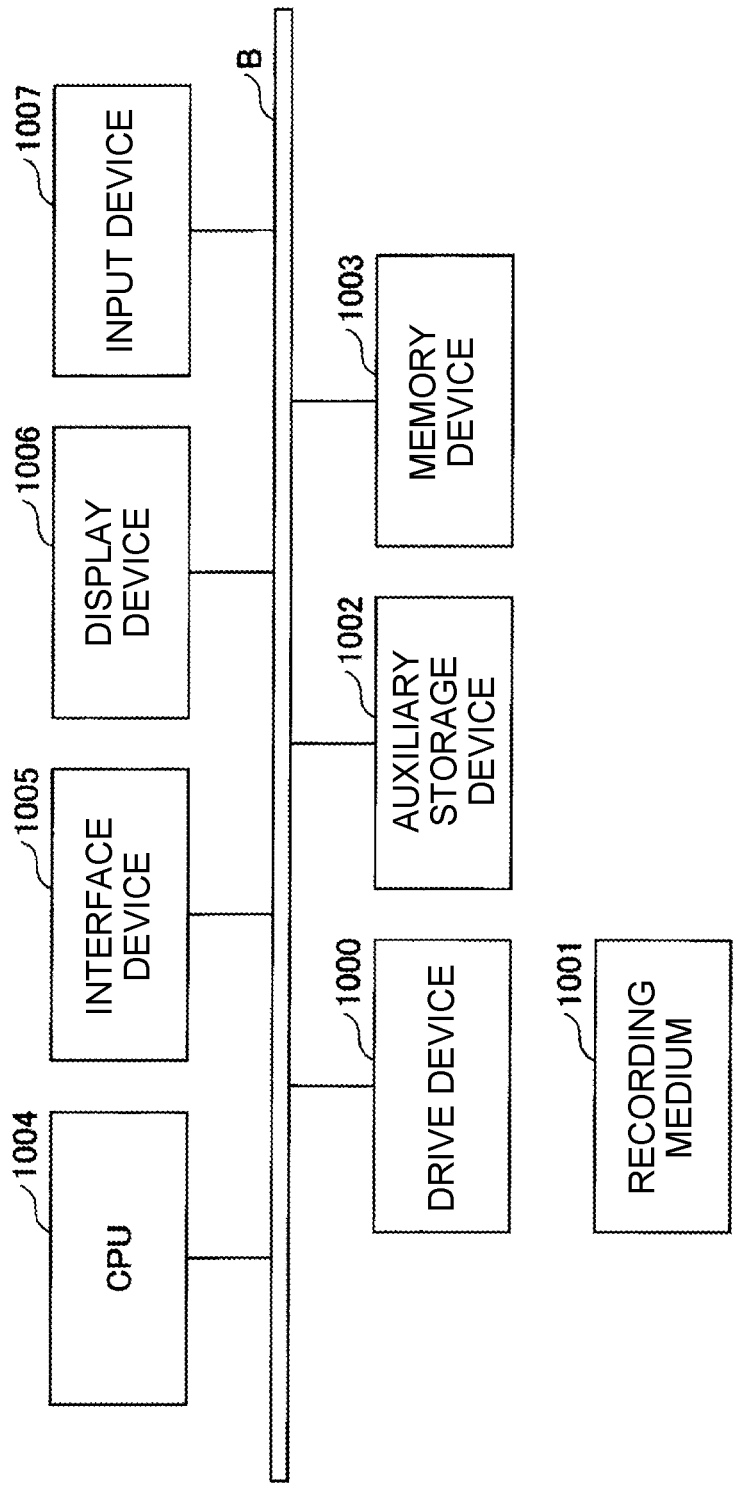
FIG. 9 is a diagram showing an example of a hardware configuration.

FIG. 9 is a diagram showing a hardware configuration example of the above computer. The computer in FIG. 9 includes a drive device 1000, an auxiliary storage device 1002, a memory device 1003, a CPU 1004, an interface device 1005, a display device 1006, an input device 1007, etc., which are connected together through a bus B.

The program that implements a process in the computer is provided using, for example, a recording medium 1001 such as a CD-ROM or a memory card. When the recording medium 1001 with the program stored therein is set in the drive device 1000, the program is installed onto the auxiliary storage device 1002 from the recording medium 1001 through the drive device 1000. However, the program is not necessarily installed using the recording medium 1001 but may be downloaded from another computer through a network. The auxiliary storage device 1002 stores not only the installed program but also necessary file, data, etc.

The memory device 1003 reads and stores the program from the auxiliary storage device 1002 in response to instructions for starting the program. The CPU 1004 implements a function related to the communication device 100 in accordance with the program stored in the memory device 1003. The interface device 1005, which is usable as an interface for connection to a network, functions as means for input and output through the network. The display device 1006 displays a GUI (Graphical User Interface), etc. provided by the program. The input device 157, which includes a keyboard and mouse, a button, a touch panel, or the like, is usable for inputting a variety of operating instructions.

Description will be made below on specific examples of system workings according to the present embodiment with reference to practical examples below. It should be noted that a process order in a sequence described below is by way of example and the order described below is not limitation.
(Practical Examples)

Figure 10:
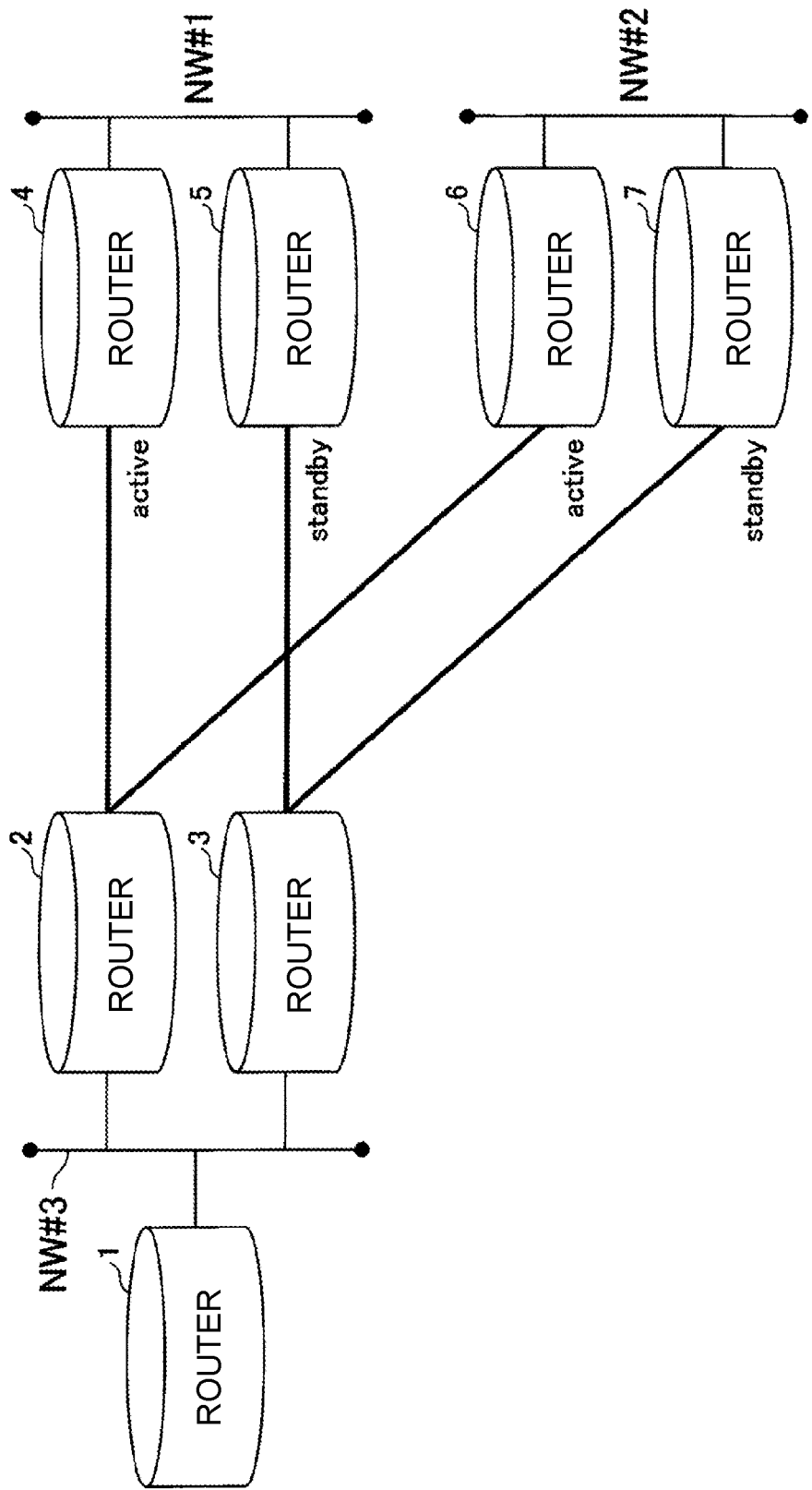
FIG. 10 is a system configuration diagram in a practical example.

FIG. 10 shows a system configuration according to the present practical example. This configuration is similar to the configuration shown in FIG. 4. Thus, NW #3 is provided with the routers 1 to 3. The routers 4 and 5 are connected to NW #1 with a BGP-based multipath provided between the routers 4 and 5 of NW #1 and the routers 2 and 3 of NW #3. In addition, the routers 6 and 7 are connected to NW #2 with a BGP-based multipath provided between the routers 6 and 7 of NW #2 and the router 2 and router 3 of NW #3.

Example of Workings for Initialization

Figure 11:
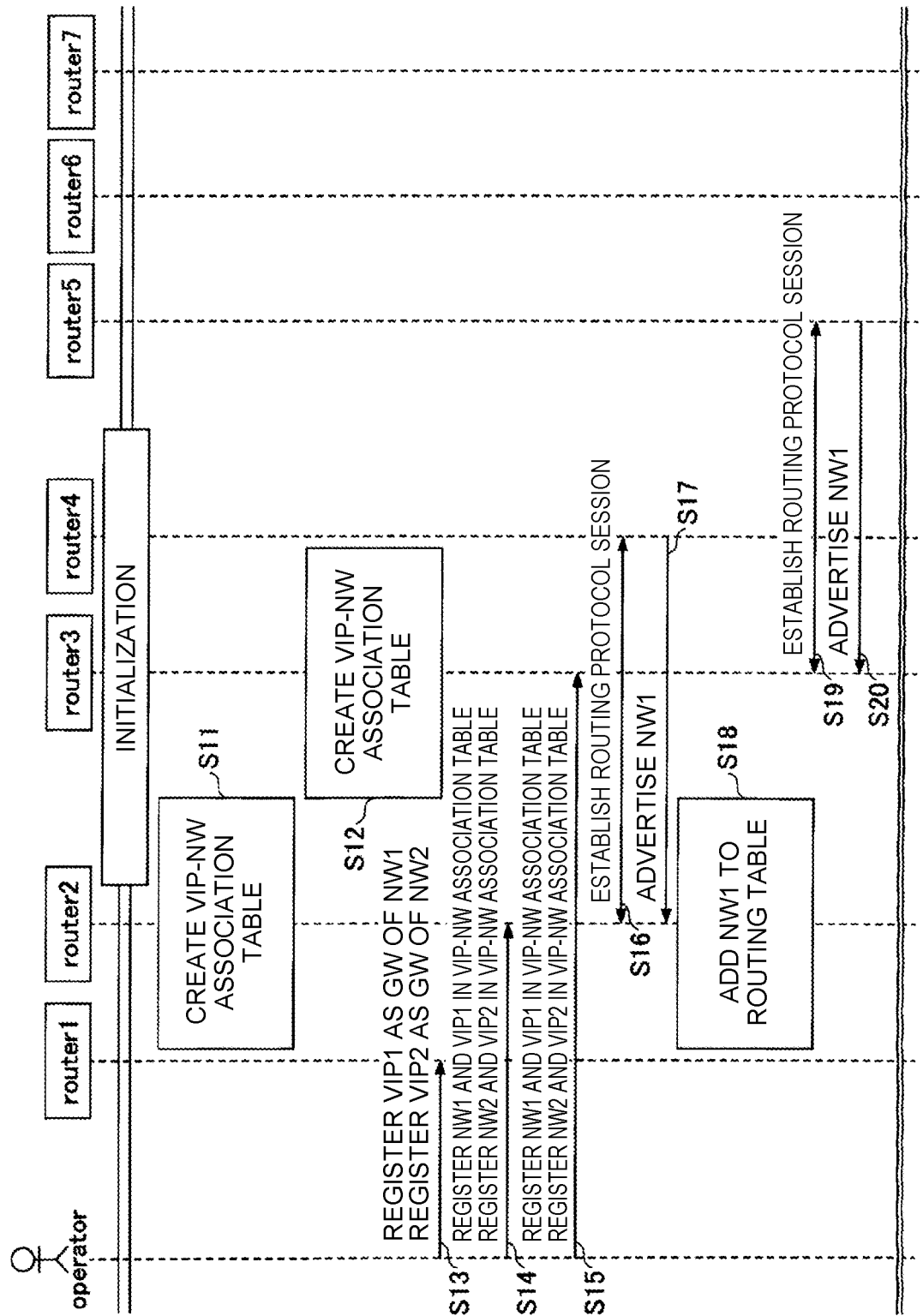
FIG. 11 is a working sequence diagram in the practical example.
Figure 12:
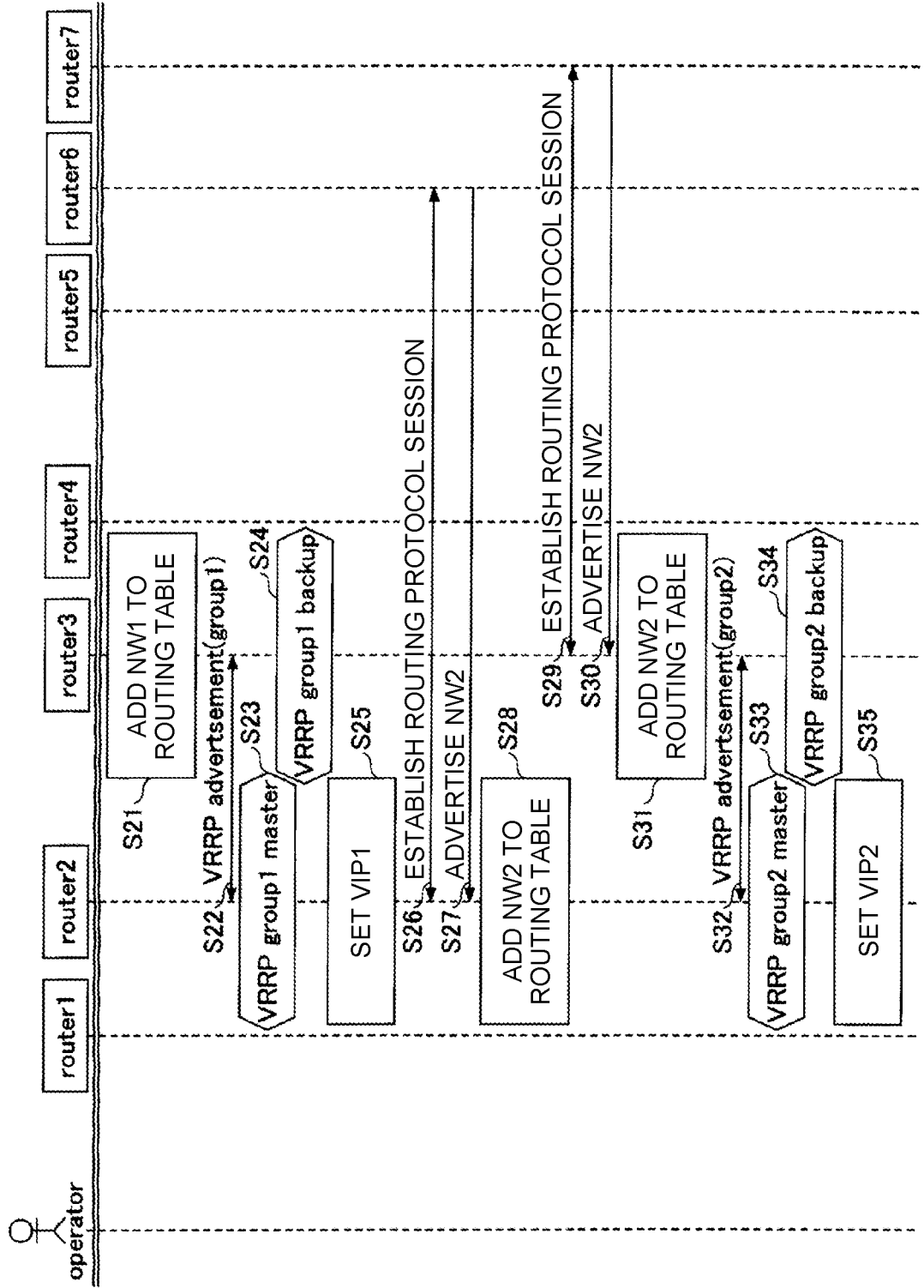
FIG. 12 is a working sequence diagram in the practical example.

First, description will be made on workings for initialization with reference to FIG. 11 and FIG. 12. In S11, a VIP-NW association table is created in the router 2. In S12, a VIP-NW association table is created in the router 3.

In S13, an operator registers VIP #1 as a GW (gateway) of NW #1 and VIP #2 as a GW (gateway) of NW #2 with the router 1.

In S14, the operator registers NW #1 and VIP #1 in the VIP-NW association table and NW #2 and VIP #2 in the VIP-NW association table with the router 2. Similarly, in S15, the operator registers NW #1 and VIP #1 in the VIP-NW association table and NW #2 and VIP #2 in the VIP-NW association table with the router 3.

In S16, a BGP routing protocol session is established between the router 2 and the router 4. In response to receiving an advertisement of NW #1 from the router 4 in S17, the router 2 adds NW #1 to the routing table in S18.

In S19, a BGP routing protocol session is established between the router 3 and the router 5. The router 3 receives the advertisement of NW #1 from the router 5 in S20. Referring further to FIG. 12, the router 3 adds NW #1 to the routing table in S21.

In S22, that is, an initial state of the VRRP group 1, the router 2 and router 3 send and receive a VRRP advertisement (including VRID=1) of the VRRP group 1. On the basis of the VRRP priority of the VRRP group 1, the router 2 becomes the master in the VRRP group 1 in S23 and the router 3 becomes the backup in the VRRP group 1 in S24.

With the router 2 becoming the master in the VRRP group 1, the router 2 sets VIP #1 as a VIP usable by the router 2 for communication on the NW #3 side in S25.

In S26, a BGP routing protocol session is established between the router 2 and the router 6. In response to receiving an advertisement of NW #2 from the router 6 in S27, the router 2 adds NW #2 to the routing table in S28.

In S29, a BGP routing protocol session is established between the router 3 and the router 7. The router 3 receives the advertisement of NW #2 from the router 7 in S30. The router 3 adds NW #2 to the routing table in S31.

In S32, that is, an initial state of the VRRP group 2, the router 2 and router 3 send and receive a VRRP advertisement (including VRID=2) of the VRRP group 2. On the basis of the VRRP priority of the VRRP group 2, the router 2 becomes the master in the VRRP group 2 in S33 and the router 3 becomes the backup in the VRRP group 2 in S34.

With the router 2 becoming the master in the VRRP group 2, the router 2 sets VIP #2 as the VIP usable by the router 2 for communication on the NW #3 side in S35.

Example of Workings for Switching

Figure 13:
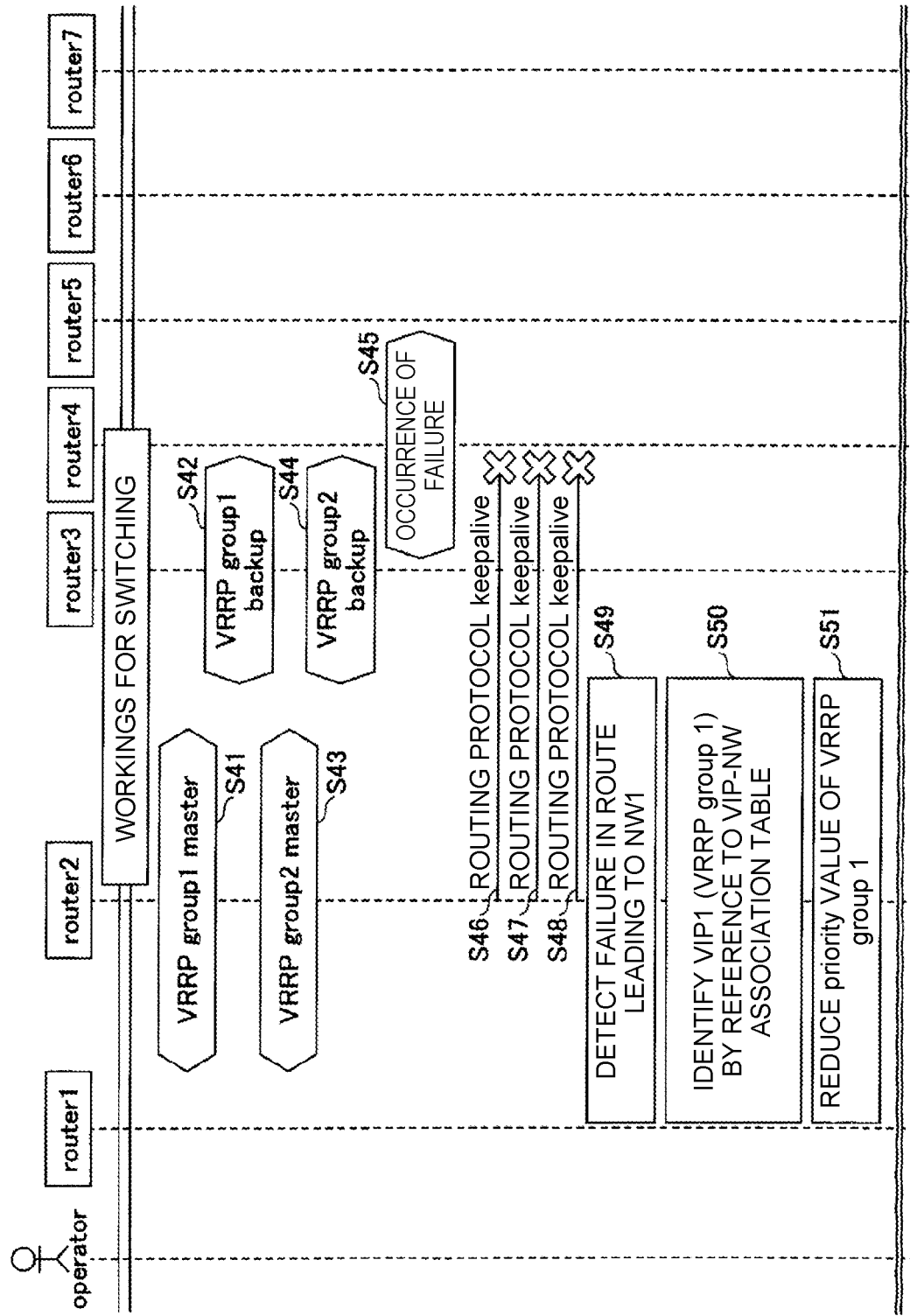
FIG. 13 is a working sequence diagram in the practical example.

Subsequently, description will be made on an example of workings for switching with reference to FIG. 13 and FIG. 14. In a state where the router 2 is the master in the VRRP group 1, the router 3 is the backup in the VRRP group 1, the router 2 is the master in the VRRP group 2, and the router 3 is the backup in the VRRP group 2 as indicated in S41, S42, S43, and S44, a failure occurs on a router-4 side in S45.

A keepalive packet from the router 2 (S46 to S48) fails to be received by the router 4, which causes the router 2 to detect the failure in a route leading to NW #1 in S49. In S50, the router 2 identifies VIP #1 as a VIP corresponding to NW #1 by reference to the VIP-NW association table. In other words, the router 2 identifies the VRRP group 1 as a VRRP group corresponding to NW #1 by reference to the VIP-NW association table. In S51, the router 2 reduces a value of the priority of the VRRP group 1.

Figure 14:
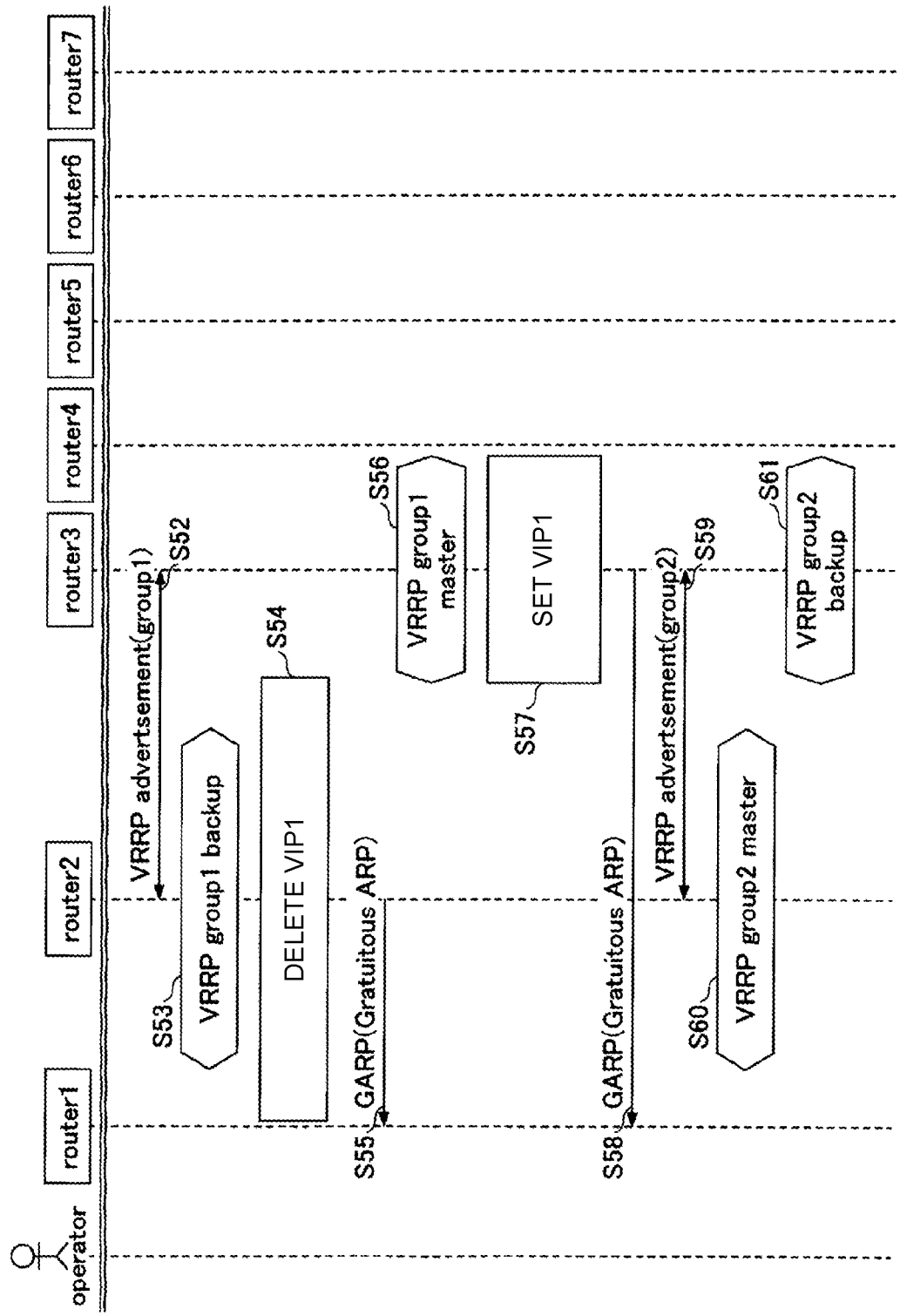
FIG. 14 is a working sequence diagram in the practical example.

Referring further to FIG. 14, by virtue of a VRRP advertisement in the VRRP group 1 in S52, the router 2 detects that the own priority is smaller than the priority of the router 3 and transitions to the backup in the VRRP group 1 in S53. In S54, the router 2 deletes VIP #2 from the VIPs usable for communication.

In S55, the router 2 sends a GARP to the router #1. By virtue of the GARP, the router #1 deletes correspondence information regarding VIP #1 and the virtual MAC address corresponding to VIP #1.

In S56, the router 3 detects that the own priority is larger than the priority of the router 2 and transitions to the master in the VRRP group 1. In S57, the router 3 sets VIP #1 as a VIP usable for communication.

In S58, the router 3 sends a GARP to the router #1. By virtue of the GARP, the router #1 sets correspondence information regarding VIP #1 and the virtual MAC address corresponding to VIP #1. As indicated in S59 to S61, for the VRRP group 2, a state where the router 2 is the master in the VRRP group 2 and the router 3 is the backup in the VRRP group 2 goes on.

Effect of Embodiment

As described above, the technology according to the present embodiment makes it possible to improve reliability of a communication system using a protocol and a multipath, the protocol enabling formation of a redundancy configuration including a plurality of communication devices by use of a virtual IP address.

Summary of Embodiment

At least communication device, switching control method, and program according to items below are disclosed herein.

(Item 1)

A communication device in which a protocol is workable, the protocol enabling formation of a redundancy configuration including a plurality of communication devices by use of a virtual IP address, the communication device including:

a table storage unit configured to store a table in which, for each of a plurality of destination networks connected to the communication device through a path, the virtual IP address and the destination network are associated with each other; and a control unit configured to identify, in response to detection of a failure in the path connected to one of the destination networks, the virtual IP address associated with the destination network by reference to the table and cause the identified virtual IP address to transition to another communication device, the another communication device forming the redundancy configuration with the communication device.

(Item 2)

The communication device according to item 1, in which in a state before the failure occurs, the communication device is in a state of a master in a redundancy configuration group corresponding to the identified virtual IP address, and the control unit is configured to lower a priority of the group in response to detection of the failure, thereby causing the another communication device to transition from a state of a backup to the state of the master in the group.

(Item 3)

The communication device according to item 1 or item 2, in which in a case of recovery from the failure in the path, the control unit is configured to refrain from route advertisement to an opposite communication device until failback of the virtual IP address from the another communication device to the communication device.

(Item 4)

A switching control method to be performed by a communication device in which a protocol is workable, the protocol enabling formation of a redundancy configuration including a plurality of communication devices by use of a virtual IP address, the communication device including a table storage unit configured to store a table in which, for each of a plurality of destination networks connected to the communication device through a path, the virtual IP address and the destination network are associated with each other, the method including identifying, in response to detection of a failure in the path connected to one of the destination networks, the virtual IP address associated with the destination network by reference to the table and causing the identified virtual IP address to transition to another communication device, the another communication device forming the redundancy configuration with the communication device.

(Item 5)

A program for causing a computer to function as the units of the communication device according to any one of claims 1 to 3.

The present embodiment is described above; however, the present invention is not limited to such a specific embodiment and may be modified or altered in a variety of manners without departing from the scope of the spirit of the present invention described in the scope of the claims.

REFERENCE SIGNS LIST

1 to 7 Router
100 Communication device
110 Communication unit
120 Control unit
130 Table storage unit
1000 Drive device
1001 Recording medium
1002 Auxiliary storage device
1003 Memory device
1004 CPU
1005 Interface device
1006 Display device
1007 Input device

The invention claimed is:

1. A communication device in which a protocol is workable, the protocol enabling formation of a redundancy configuration comprising a plurality of communication devices by use of a virtual IP address, the communication device comprising:

a table storage unit, including one or more processors, configured to store a table in which, for each of a plurality of destination networks connected to the communication device through a path, the virtual IP address and the destination network are associated with each other; and a control unit, including one or more processors, configured to identify, in response to detection of a failure in the path connected to one of the destination networks, the virtual IP address associated with the destination network by reference to the table and cause the identified virtual IP address to transition to another communication device, the another communication device forming the redundancy configuration with the communication device.

2. The communication device according to claim 1, wherein
in a state before the failure occurs, the communication device is in a state of a master in a redundancy configuration group corresponding to the identified virtual IP address, and
the control unit is configured to lower a priority of the group in response to detection of the failure, thereby causing the another communication device to transition from a state of a backup to the state of the master in the group.

3. The communication device according to claim 1, wherein
in a case of recovery from the failure in the path, the control unit is configured to refrain from route advertisement to an opposite communication device until failback of the virtual IP address from the another communication device to the communication device.

4. A switching control method to be performed by a communication device in which a protocol is workable, the protocol enabling formation of a redundancy configuration comprising a plurality of communication devices by use of a virtual IP address, the communication device comprising a table storage unit configured to store a table in which, for each of a plurality of destination networks connected to the communication device through a path, the virtual IP address and the destination network are associated with each other, the method comprising identifying, in response to detection of a failure in the path connected to one of the destination networks, the virtual IP address associated with the destination network by reference to the table and causing the identified virtual IP address to transition to another communication device, the another communication device forming the redundancy configuration with the communication device.

5. The switching control method according to claim 4, wherein
in a state before the failure occurs, the communication device is in a state of a master in a redundancy configuration group corresponding to the identified virtual IP address, and the switching control method further comprises:
lowering a priority of the group in response to detection of the failure, thereby causing the another communication device to transition from a state of a backup to the state of the master in the group.

6. The switching control method according to claim 4, further comprising:
in a case of recovery from the failure in the path, refraining from route advertisement to an opposite communication device until failback of the virtual IP address from the another communication device to the communication device.

7. A non-transitory computer-readable storage medium storing a program for causing a computer to function as units of a communication device to perform a switching control method, wherein a protocol in the communication device is workable, the protocol enabling formation of a redundancy configuration comprising a plurality of communication devices by use of a virtual IP address, the communication device comprises a table storage unit configured to store a table in which, for each of a plurality of destination networks connected to the communication device through a path, the virtual IP address and the destination network are associated with each other, and the switching control method comprises: identifying, in response to detection of a failure in the path connected to one of the destination networks, the virtual IP address associated with the destination network by reference to the table and causing the identified virtual IP address to transition to another communication device, the another communication device forming the redundancy configuration with the communication device.

8. The non-transitory computer-readable storage medium according to claim 7, wherein
in a state before the failure occurs, the communication device is in a state of a master in a redundancy configuration group corresponding to the identified virtual IP address, and the switching control method further comprises:
lowering a priority of the group in response to detection of the failure, thereby causing the another communication device to transition from a state of a backup to the state of the master in the group.

9. The non-transitory computer-readable storage medium according to claim 7, wherein the switching control method further comprises:
in a case of recovery from the failure in the path, refraining from route advertisement to an opposite communication device until failback of the virtual IP address from the another communication device to the communication device.

* * * * *